United States Patent

[11] 3,561,613

| [72] | Inventor | Van N. Moad |
| | | 122 12th Ave South, Nampa, Idaho 83651 |
| [21] | Appl. No. | 745,203 |
| [22] | Filed | July 16, 1968 |
| [45] | Patented | Feb. 9, 1971 |

[54] APPARATUS FOR SHIFTING IRRIGATION PIPE
12 Claims, 12 Drawing Figs.

[52] U.S. Cl..................................................... 214/1,
    214/522
[51] Int. Cl...................................................... B65g 41/00
[50] Field of Search.......................................... 214/1P.L.,
    1, 1P, 83.1, 519, 522; 198/113

[56] References Cited
UNITED STATES PATENTS

| Re24,976 | 5/1961 | Goesch | 214/1(P.L.) |
| 2,699,877 | 1/1955 | Huston | (214/83.1UX) |
| 2,996,197 | 8/1961 | Smeal | 214/1(P.L.) |
| 2,005,442 | 6/1935 | Spieel | (214/83.1UX) |
| 2,780,376 | 2/1957 | Sanders | 214/519 |
| 2,782,943 | 2/1957 | Jones et al. | 198/113X |

*Primary Examiner*—Gerald M. Forlenza
*Assistant Examiner*—Frank E. Werner
*Attorney*—Clarence A. O'Brien and Harvey B. Jacobson ABSTRACT: An apparatus including a mobile platform having a generally horizontally disposed boom supported at a first inner end portion of the boom from the platform and extending transversely outwardly from the platform at the second outer end portion thereof. The boom includes conveying means for supporting irrigation pipe sections placed thereon by a first workman and conveying the pipe sections from the outer end portion of the boom to the inner end portion thereof for removal therefrom by the operator of said platform and placement upon a rearwardly and downwardly inclined chute supported adjacent the inner end portion of the boom, the platform being adapted to be advanced over a field to be irrigated in a path extending transversely of the boom.

Van N. Moad
INVENTOR.

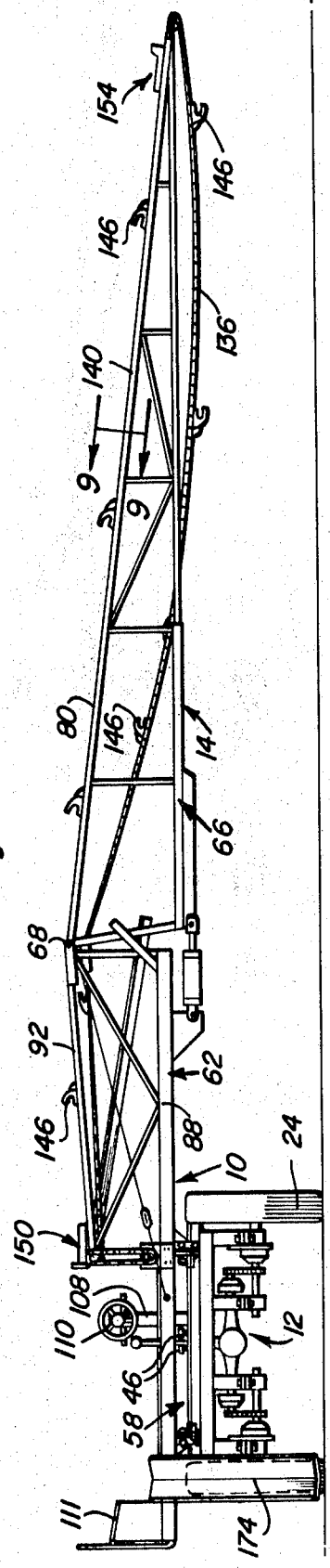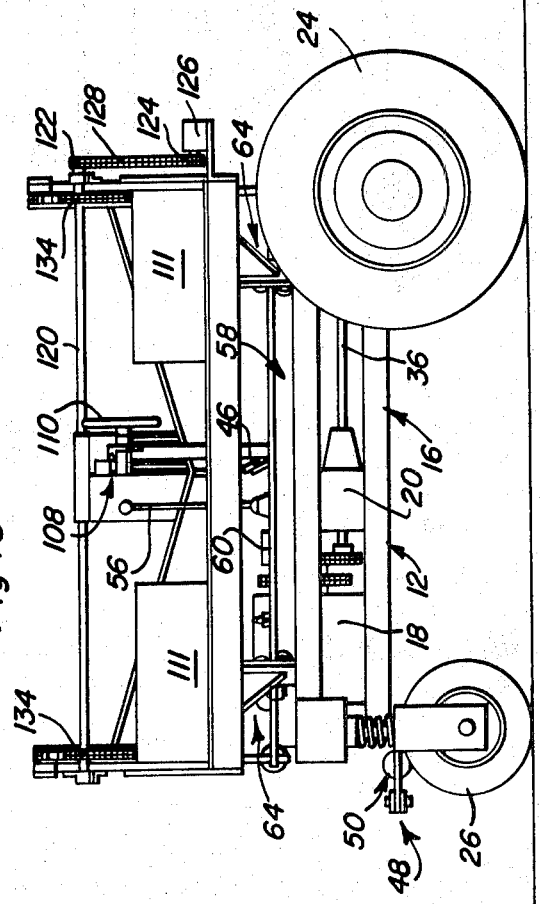
Van N. Moad
INVENTOR.

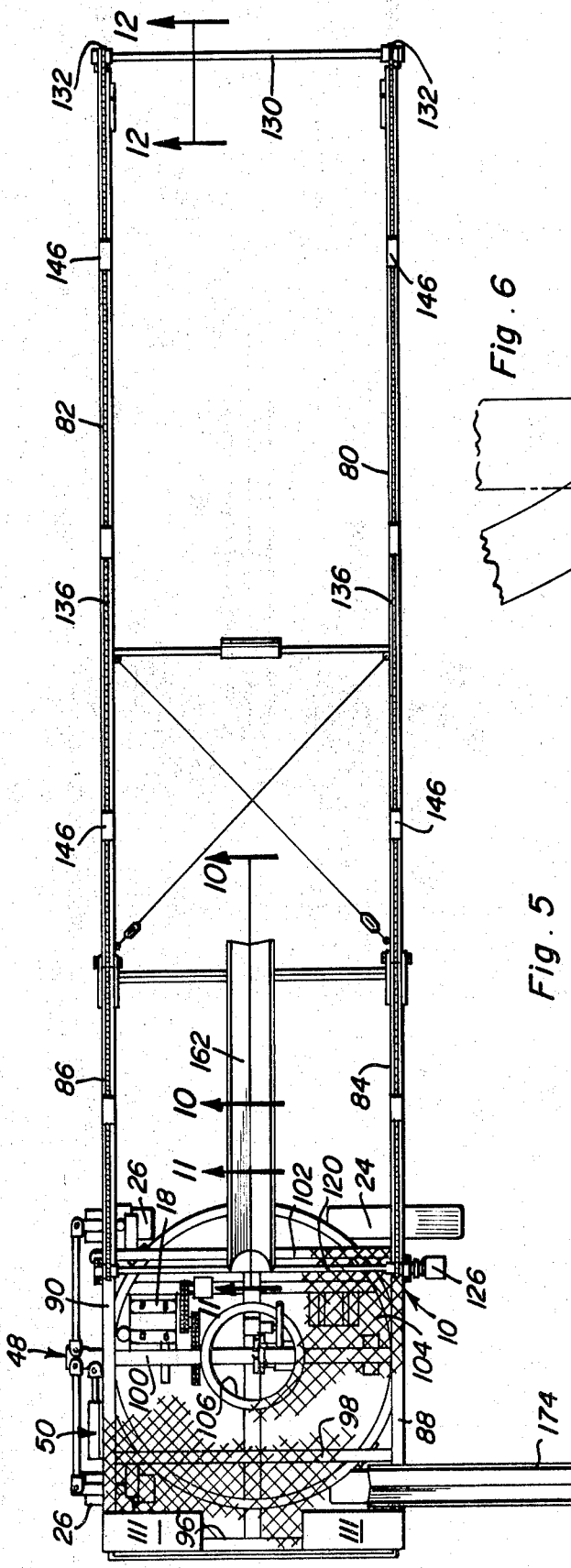

PATENTED FEB 9 1971

Van N. Moad
INVENTOR.

BY *Clarence A. O'Brien*
and *Harvey B. Jacobson*
Attorneys

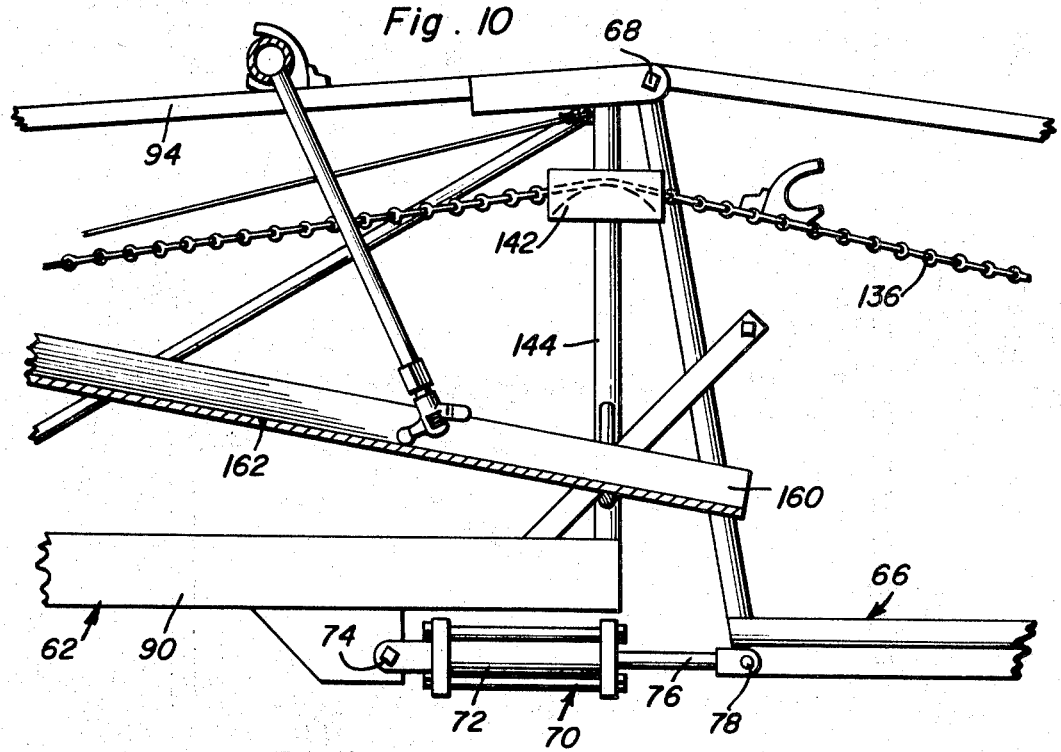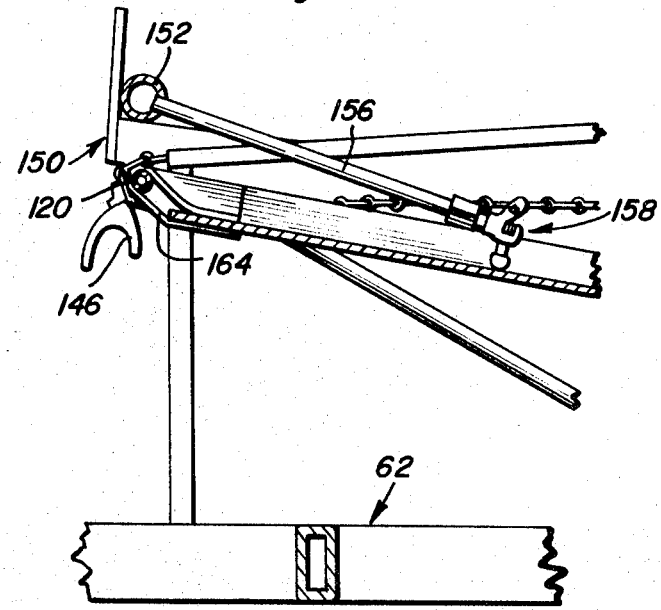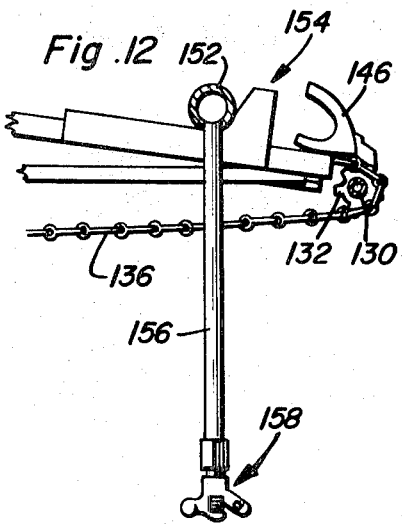

3,561,613

APPARATUS FOR SHIFTING IRRIGATION PIPE

Heretofore, when it has been necessary to shift the position of an irrigation pipeline comprising a plurality of end aligned and connected irrigation pipe sections, it has been necessary that the individual pipe sections be disconnected from the pipeline and manually carried transversely of the pipeline to the new line location and with each pipe section so transferred connected to the last transferred pipe section as the latter is placed along the line of the new pipeline position.

In the past it has taken an average of 8 to 12 men to move an irrigation pipeline on a section of irrigatable land. These men must transfer the individual pipe sections by hand and reassemble them in the new irrigation line position and a large number of man-hours has been heretofore consumed in the process of manually carrying pipeline sections 50 to 60 feet from the existing pipeline location to the new pipeline location. In addition to the large number of man-hours of labor consumed, the manual transporting of individual pipeline sections from one location to the next is usually accompanied by trampling of the crops being irrigated.

With the machine or apparatus of the instant invention two workmen, a first stationed at the outer end of the boom of the machine and the second on the inner end of the boom for operating the controls of the mobile platform, may transfer an irrigation pipeline from one location to the next and reassemble the individual irrigation pipe sections in a rapid manner and without the usual accompanied trampling of the crops being irrigated. The mobile platform is advanced by the second workman down the line of the new position of the pipeline and the first workman is positioned at the outer end of the boom which is positioned to move down along the existing line of pipe sections. As the mobile platform is advanced, the workman at the outer end of the boom successively uncouples the individual pipe sections of the existing pipeline and places the pipe sections upon the outer end of the boom for conveying along the latter to the inner end of the boom at which position the conveyed pipe sections are handled by the operator of the platform and reassembled from the platform to form the new pipeline as the mobile platform moves along the path of the new pipeline. In this manner, not only does the apparatus of the instant invention provide a means of quickly transferring an irrigation pipeline without trampling crops and with a minimum of manual labor, but the workmen which handle the pipe sections being transferred exert far less manual effort in handling each pipe section and may therefore work at a faster rate without tiring thereby increasing the effectiveness of the pipe transferring apparatus.

The main object of this invention is to provide a novel apparatus for shifting irrigation pipe sections from the position of an existing pipeline to the position of a new pipeline spaced approximately 50 to 60 feet away from the first pipeline position.

Another object of this invention is to provide an apparatus in accordance with the preceding objects which may be readily operated by two workmen to rapidly transfer individual pipe sections from the position of a first pipeline to the position of a second pipeline.

Still another object of this invention is to provide an apparatus in accordance with the preceding objects which will eliminate crops between irrigation pipeline positions being trampled.

Yet another object of this invention is to provide an apparatus in accordance with the preceding objects and which will substantially reduce the manual labor previously involved in shifting an irrigation pipeline from one location to another.

A final object of this invention to be specifically enumerated herein is to provide an apparatus in accordance with the preceding objects which will conform to conventional forms of operation, be of simple construction and be easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a side elevational view of the assemblage illustrated in FIG. 1 as seen from the left side of FIG. 1;

FIG. 3 is a somewhat enlarged side elevational view of the assemblage illustrated in FIGS. 1 and 2 and as seen from the left side of FIG. 2;

FIG. 4 is a somewhat enlarged top plan view of the apparatus;

FIG. 5 is an enlarged fragmentary vertical sectional view taken substantially upon a plane passing through one of the roller assemblies by which the boom is swingably supported from the mobile portion of the apparatus for oscillation about an upstanding axis;

FIG. 6 is a horizontal sectional view taken substantially upon the plane indicated by the section line 6–6 of FIG. 5;

FIG. 10 is an enlarged fragmentary vertical sectional view taken substantially upon the plane indicated by the section line 10–10 of FIG. 4 and illustrating the manner in which the outer end of the boom may be raised and lowered and also the manner in which the pipe sections being conveyed by the boom are handled;

FIG. 11 is an enlarged fragmentary vertical sectional view taken substantially upon the plane indicated by the section line 11–11 of FIG. 4; and FIG. 12 is an enlarged fragmentary vertical sectional view taken substantially upon the plane indicated by the section line 12–12 of FIG. 4.

Figure 7:
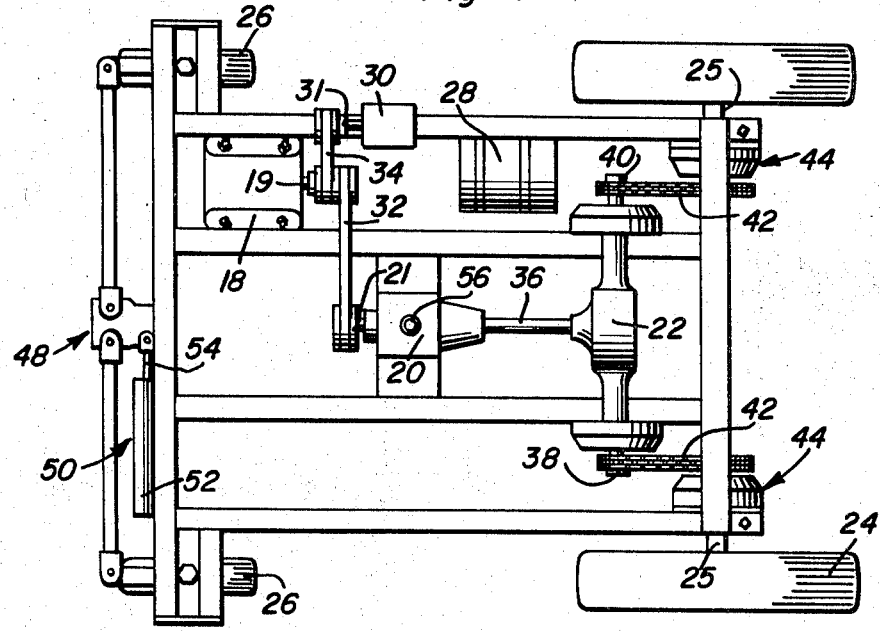
FIG. 7 is a top plan view of the mobile platform portion of the apparatus with the boom assembly removed.
Figure 8:
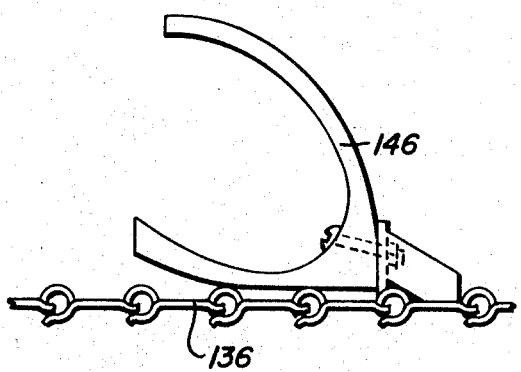
FIG. 8 is a fragmentary enlarged side elevational view of one of the conveyor chains of the boom illustrating the manner in which one of the irrigation pipe section engaging members is mounted on the conveyor chains.
Figure 9:
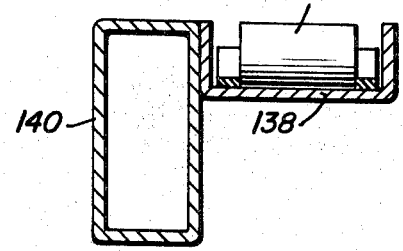
FIG. 9 is an enlarged fragmentary vertical sectional view taken substantially upon the plane indicated by the section line 9–9 of FIG. 2.

Referring now more specifically to the drawings, the numeral 10 generally designates the irrigation pipe section transferring apparatus of the instant invention which includes a mobile platform referred to in general by the reference numeral 12 and generally horizontally disposed boom generally referred to by the reference numeral 14. The mobile platform 12 includes a frame structure referred to in general by the reference numeral 16 from which a conventional internal combustion engine 18, a transmission 20, a differential 22, rear drive wheels 24, front steerable wheels 26, a fluid reservoir 28 and a fluid pump 30 are supported. The input shaft portions 21 and 31 of the transmission 20 and the fluid pump 30 are driven from the output shaft 19 of the internal combustion engine 18 by means of endless flexible belts 32 and 34, see FIG. 7. In addition, the output shaft of the transmission 20 is coupled to the differential 22 by means of a drive shaft 36 and the outer ends of the differential shafts 38 and 40 of the differential 22 are drivingly coupled to the axle shafts 25 upon which the rear wheels 24 are mounted by means of endless flexible chains 42. The axle shafts 25 have hydraulic brake assemblies generally referred to by the reference numerals 44 operatively associated therewith individually controlled by means of brake pedals 46 supported from the frame structure 16 and the front steerable wheels 26 are controlled by means of a steering linkage assembly referred to in general by the reference numeral 48 actuated by a double-acting fluid motor referred to in general by the reference numeral 50 whose cylinder portion 52 is supported from the frame structure 16 and whose piston rod portion 54 is connected to the steering linkage assembly 48, see FIG. 7.

The brake pedals 46 are supported from a generally centered position on the frame structure 16 and the transmission 20 includes a shift lever 56 which projects upwardly from a generally centered position of the frame structure 16.

The frame structure 16 includes a large diameter upstanding cylindrical guide assembly referred to in general by the reference numeral 58 rigidly supported from an upper portion of the frame structure 16. The cylindrical guide assembly 58 includes an upper radially outwardly projecting and circumferentially extending support flange 60 and the boom 14 includes a base end section referred to in general by the reference numeral 62 which is supported from the support flange 60 for oscillation relative to the latter by means of a plurality of roller support assemblies referred to in general by the reference numeral 64 dependingly supported from the base end section 62 of the boom 14 and rollingly engaging the support flange 60 at points spaced circumferentially thereabout.

The base end section 62 of the boom 14 is elongated and has the base end portion of the outer end section of the boom 14 generally referred to by the reference numeral 66 pivotally supported from one end portion of the base end section 62 as at 68 for oscillation relative to the base end section 62 by means of a pair of fluid motors 70 having their cylinder portions 72 secured to the base end section 62 as at 74 and their piston rod portions 76 secured to the outer end section 66 as at 78.

The outer end section 66 of the boom 14 includes opposite side sections 80 and 82 which are suitably interconnected and braced and the base end section 62 includes opposite side sections 84 and 86, the fluid motors 70 being secured between the sections 80 and 84 and the sections 82 and 86.

The base end section 62 of the boom 14 includes a pair of opposite side lower longitudinal members 88 and 90 and a pair of channel-shaped upper longitudinal members 92 and 94. The ends of the lower longitudinal members 88 and 90 remote from the outer end section 66 of the boom 14 include transversely extending brace members 96, 98, 100 and 102 secured therebetween and the assemblies 64 are dependingly supported from the transverse brace members 98 and 102. An expanded metal support platform 104 is secured between the lower longitudinal members 88 and 90 and over the transverse brace members 96, 98, 100 and 102 in any convenient manner and includes a center opening 106 upwardly through which the brake pedals 46, the shift lever 56 and an upright standard 108 project, the upper end of the standard 108 having a fluid pressure control valve assembly generally referred to by the reference numeral 108 supported therefrom and in part operated by a steering wheel 110 for controlling the fluid pressure to the double-acting fluid motor 50 for steering purposes. In addition, a pair of ballast boxes 111 are supported from the ends of the longitudinal members 88 and 90 remote from the outer end section 66 of the boom 14 and contain ballast material to at least partially offset the cantilever weighting of the outer end section 66 of the boom 14.

Each of the assemblies 64 includes a depending support plate portion 112 from which a single horizontal roller 114 is journaled and three vertical rollers 116 and 118 are journaled. The horizontal rollers 114 are rollingly engaged with the outer peripheral edge of the support flange 60 and the rollers 116 and 118 are rollingly engaged with the upper and lower surfaces of the support flange 60. The assemblies 64 which are supported from the transverse brace member 98 include two lower vertical rollers 118 and a single upper roller 116 whereas the assemblies 64 supported from the horizontal transverse brace member 102 include a pair of upper rollers 116 and a single lower roller 118.

A transverse shaft 120 is journaled from and between the rear ends of the upper longitudinal members 92 and 94 and has a first sprocket wheel 122 mounted on one end portion thereof driven from a sprocket wheel 124 carried by the output shaft of a fluid motor 126 supported from the side section 84 through a roller chain 128. In addition, a second transverse shaft 130 is journaled between the ends of the side sections 80 and 82 remote from the base end section 62 of the boom 14 and has a pair of link belt sprocket wheels 132 mounted on its opposite ends. The sprocket wheels 132 are aligned with similar sprocket wheels 134 mounted on the shaft 120 and a pair of elongated endless link belt or flat chains 136 are entrained about each pair of corresponding sprocket wheels 132 and 134, the upper reaches of the belts 136 being cradled in channel-shaped members 138 carried by the upper longitudinal members 140 of the side sections 80 and 82 and the channels defined by the upper longitudinal members 90 and 94.

As can best be seen from FIG. 10 of the drawings each of the side sections 84 and 86 includes a chain support member 142 over which the lower reach of the corresponding belts or chains 136 are trained. The chain support members 142 are supported from the outer end portions of the base end section 62 of the boom 14 and specifically from vertical brace members 144 secured between corresponding pairs of the upper longitudinal members 92 and 94 and the lower longitudinal members 88 and 90. Further, each of the chains or belts 136 has a plurality of generally C-shaped pipe engaging members 146 therefrom at points spaced longitudinally therealong. The pipe engaging members 146 are constructed of stiff but flexible and resilient material and the chains or belts 136 include pairs of transversely aligned pipe engaging members 146.

The support platform 104 defines, adjacent the center opening 106, an operator's position for operating the brake pedals 46, the shift lever 56 and the pressure control valve assembly 108 and steering wheel 110. The base end section 62 of the boom 14 includes a pair of support structures generally referred to by the reference numerals 150 supported from the ends of the upper longitudinal members 92 and 94 remote from the outer end section 66 of the boom 14 and which are adapted to be engaged by and to support longitudinally spaced portions of pipe sections conveyed from the outer end sections 66 of the boom 14 to the base end section 62 of the boom 14. From FIG. 11 of the drawings it may be appreciated that as a pipe section 152 is conveyed toward the support structures 150 by the pipe engaging members 146, the pipe section 152 will engage and be elevated by the support structures 150 so as to be shifted out of engagement with the associated pipe engaging members 146. Then, the pipe engaging members 146 may move about the shaft 120 and toward the chain or belt support members 142. However, the chains or belts 136 are twisted 180° about their longitudinal extent between the shaft 120 and the chain support members 142 in order that the pipe engaging members 146 will be disposed on top of the chains 136 when they pass over the chain support members 142. In addition, each reach of chain 136 extending between the support members 142 and the shaft 130 is rotated 180° in the opposite direction so as to again place the pipe engaging members 146 on the outside of the chains 136 before the pipe engaging members 146 pass about the shaft 130.

The ends of the upper longitudinal members 140 of the side sections 80 and 82 remote from the base end section 62 of the boom 14 include additional support structures generally referred to by the reference numerals 154 and upon which the pipe sections 152 are adapted to be successively placed and supported prior to engagement of the pipe engaging members 146 therewith and conveyance of the pipe section 152 along the boom 14 toward the support structure 150.

Each of the pipe sections 152 include a center standard pipe 156 which is disposed in an upright position when the pipe section is in use and topped by a sprinkler assembly generally referred to by the reference numeral 158. As the pipe sections 152 approaches the base end section 62 of the boom 14, the lower end portions of the inverted standard pipes 156 engage the free lower end portion 160 of an outwardly and downwardly inclined chute 162 extending longitudinally of the base end section 62 of the boom 14. The upper end of the chute 162 includes attaching structure 164 by which it is supported from the shaft 120 and it may be seen from FIG. 11 of the drawings that the standard pipes 156 are generally horizontally disposed and project toward the outer end section 66 of the boom 14 when the pipe sections 152 are supported from the support structures 150.

Figure 1:
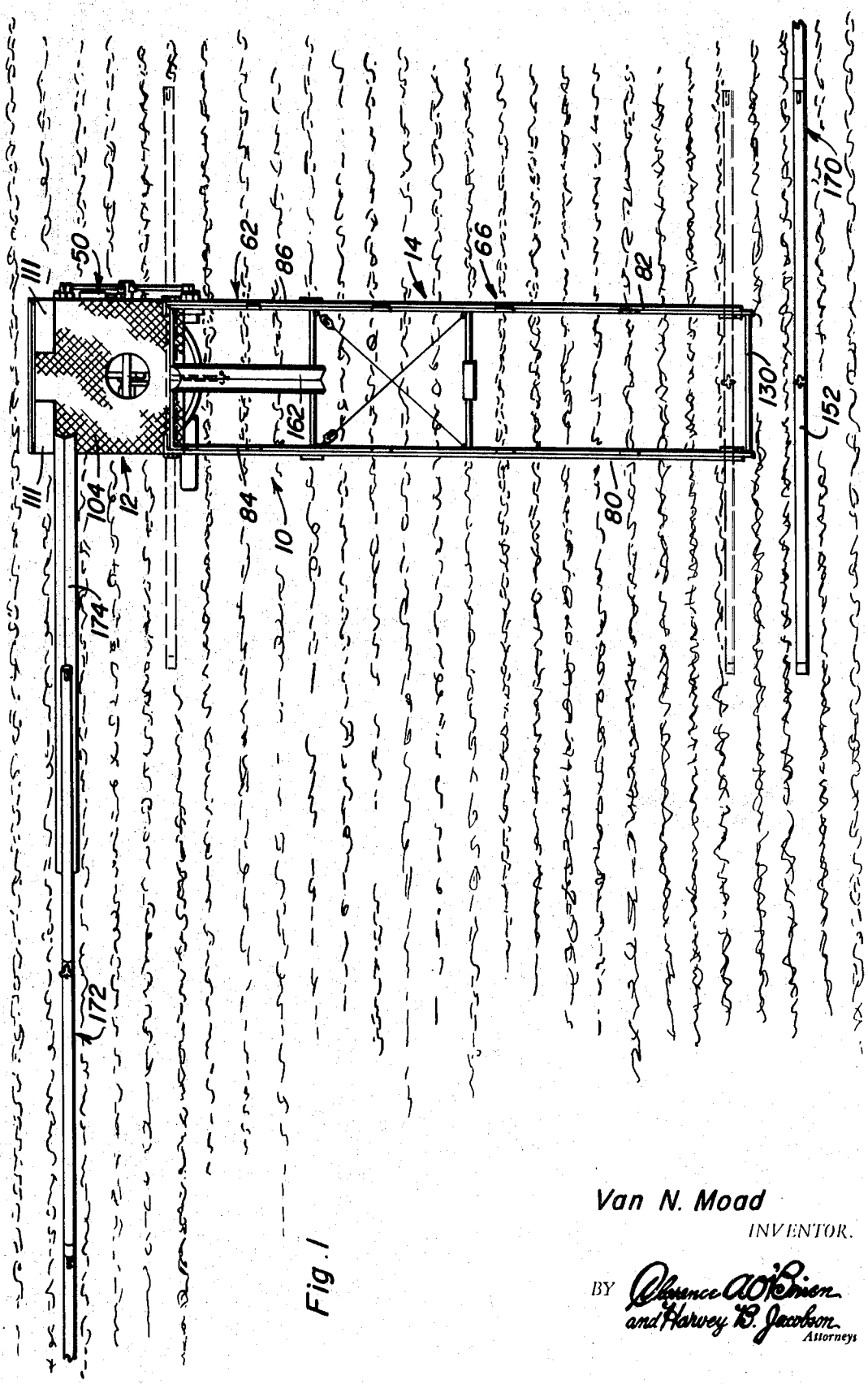
FIG. 1 is a plan view of a field to be irrigated with the apparatus of the instant invention shown in position to be moved along a new pipeline location with the free end of its boom portion positioned adjacent an existing irrigation pipeline to be dismantled.

If it is desired the front and rear wheels 26 and 24 may be supported from the frame structure 16 in a manner such that the spacing between the wheels on opposite sides of the frame structure 16 may be varied. Further, it is to be noted that the various fluid motors including fluid motors 50, 70 and 126 are supplied with fluid under pressure through the pressure control valve assembly 108 from the fluid pump 30 by suitable hydraulic lines (not shown). In addition, the base end section 62 of the boom 14 may be driven for a movement about the cylindrical guide assembly 58 by any suitable motor (not shown.) or may be manually swingable relative to the cylindrical guide assembly 58 and releasably secured in adjusted rotated position in any convenient manner. With reference now more specifically to FIG. 1 of the drawings, it may be seen that the boom 14 extends between a first pipeline generally referred to by the reference numeral 170 and a second pipeline generally referred to by the reference numeral 172. The mobile platform 12 is operative to shift the boom 14 towards the right as viewed in FIG. 1 of the drawings between the pipelines 170 and 172. The pipe section transferring apparatus 10 is operated by a first workman disposed on the platform 104 and a second workman is disposed at the first pipeline 170. As the free end of the boom 14 registers with the approximate center of consecutive pipe sections 152 of the line 170, the second workman disconnects the pipe section 152 registered with the free end of the boom 14 and places the disconnected pipe section upon the support structures 154 for engagement by the pipe engaging members 146 and conveyance toward the support structures 150. Meanwhile, the first workman on the platform 104 picks up the last conveyed pipe section 152 supported from the support structures 150, walks across the platform 104 and places the conveyed pipe section on a downwardly and rearwardly inclined chute 174 supported from the base end section 62 of the boom 14 and couples the rear end of the pipe section 152 disposed on the chute 174 to the forward end of the pipe section 152 previously positioned on the chute 174. Meanwhile, the mobile platform 12 continues to move downwardly along the pipe sections 170 and 172 and thus it may be seen that the pipe sections 152 of the pipeline 170 are smoothly and efficiently transferred from the pipeline 170 being taken up and transferred to the pipeline 172 being laid down upon the ground.

It may be appreciated that the workman at the free end of the boom 14 must walk on moist ground. However, inasmuch as the ground engaging portions of the mobile platform 12 are outwardly beyond the ground area acted upon by the sprinkler assemblies 158 of the pipeline 170, the mobile platform 12 is disposed on dry ground. Thus, by utilizing the pipe section transferring apparatus of the instant invention there is no need for workmen to repeatedly walk back and forth between the pipelines 170 and 172 which tends to trample crops and the task of transferring the pipe sections 152 of the pipeline 170 to the pipeline 172 is accomplished in an efficient and rapid manner.

Of course, the boom 14 may be constructed of any desired length determined in part by the range of the sprinkling assemblies or heads 158 and the outer end section 66 of the boom 14 may be pivotally adjusted relative to the base end section 62 of the boom 14 in order to maintain the outer end portion of the section 66 at a predetermined level above the ground even though the terrain over which the mobile platform is moving may be uneven.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

I claim:

1. a mobile platform including front and rear ends and an elongated generally horizontally disposed boom having a first inner end portion thereof supported from said platform and extending transversely outwardly from said platform at a second outer end portion thereof, said boom including conveying means, projecting above the upper longitudinal marginal edge of said boom for sequentially receiving and stationarily supporting horizontal irrigation pipe sections on the outer end portion thereof with said pipe sections extending transversely of said boom and conveying said pipe sections along the upper marginal edge of said boom from the outer end portion thereof to the inner end portion thereof with said pipe sections maintained in horizontal position extending transversely of said boom, and rearwardly and downwardly inclined support chute means supported from the rear end of said platform adjacent the inner end portion of said boom adapted to have consecutively conveyed pipe sections supported therefrom and slid downwardly relative thereto as said platform is advanced in a forward direction.

2. The combination of claim 1 wherein said inner end portion of said boom is supported from said platform for rotation about an upstanding axis whereby said boom may be swung from one side of said platform to the other and also to a position projecting outwardly behind said platform.

3. The combination of claim 1 wherein said boom includes a base end section comprising said inner end portion thereof and an outer end section comprising said outer end portion thereof, the adjacent ends of said end sections being pivotally secured together for swinging of said outer end section about a horizontal axis extending transversely of said boom, and means operatively connected between said boom sections for adjustably swinging said outer section.

4. The combination of claim 3 wherein said inner end portion of said boom is supported from said platform for rotation about an upstanding axis whereby said boom may be swung from one side of said platform to the other and also to a position projecting outwardly behind said platform.

5. The combination of claim 3 wherein said boom includes transversely spaced opposite side portions extending longitudinally thereof, said conveying means including transversely spaced elongated conveyor means extending along said opposite side portions and adapted to engage and support the undersurface portions of longitudinally spaced central portions of a pipe section disposed transversely across the outer end portion of said boom.

6. A mobile platform including front and rear ends and a generally horizontally disposed boom having a first inner end portion thereof supported from said platform and extending transversely outwardly from said platform at a second outer end portion thereof, said boom including conveying means projecting above the upper longitudinal marginal edge portion of said boom for sequentially receiving and stationarily supporting irrigation pipe sections on the outer end portion thereof and conveying said pipe sections along the top of said boom from the outer end portion of said boom to the inner end portion thereof with said pipe sections horizontally disposed and extending transversely of said boom, said platform including an operator's position adjacent the inner end portion of said boom and means spaced above said platform for receiving and stationarily supporting conveyed pipe sections adjacent said operator's position, and rearwardly and downwardly inclined support means supported from the rear end portion of said platform on the side of said operator's position remote from said means for receiving and supporting conveyed pipe sections adapted to have consecutively conveyed pipe sections supported therefrom and slid downwardly relative to said inclined support means as said platform is advanced in a forward direction.

7. The combination of claim 6 wherein said outer end portion of said boom includes support means adapted to stationarily support a pipe section placed thereon and said conveyor means includes means operative to sequentially engage pipe sections sequentially placed on said support means and remove said pipe sections from said support means upon initial conveying of said pipe sections from said outer end portion of said boom toward said inner end portion thereof.

8. The combination of claim 6 wherein said boom includes transversely spaced opposite side portions extending longitudinally thereof, said conveying means including transversely spaced elongated conveyor means extending along said opposite side portions and adapted to engage and support the undersurface portions of longitudinally spaced central portions of a pipe section disposed transversely across the outer end portion of said boom.

9. The combination of claim 6 wherein said boom includes a base end section comprising said inner end portion thereof and an outer end section comprising said outer end portion thereof, the adjacent ends of said end sections being pivotally secured together for swinging of said outer end section about a horizontal axis extending transversely of said boom, and means operatively connected between said boom sections for adjustably swinging said outer section.

10. The combination of claim 6 wherein said inner end portion of said boom is supported from said platform for rotation about an upstanding axis whereby said boom may be swung from one side of said platform to the other and also to a position projecting outwardly behind said platform.

11. An elevated ground-supported mobile platform including front and rear ends and support means for supporting irrigation pipe sections thereon of the type including readily releasably axially engageable male and female ends and with the pipe sections extending longitudinally of the platform, said platform including a rearwardly and downwardly inclined chute having a forward upper end supported from said platform and a lower rear end adapted to be positioned in slightly elevated position relative to the ground from which said platform is supported a generally horizontally disposed elongated boom including a first inner end portion supported from said platform and a second outer end portion thereof disposed outwardly of one said side of said platform, said boom including conveyor means extending along its upper marginal portion for receiving pipe sections on the outer end thereof and conveying said pipe sections therealong with said pipe sections extending transversely of said boom and to a conveyor discharge point on the inner end portion of said boom spaced above said platform, said platform defining a surface upon which an operator may stand, said support means being operative to support said pipe sections in elevated position relative to said surface the upper end of said chute being disposed at an elevation below the elevation of said position in which said support means supports said pipe sections.

12. The combination of claim 11 wherein the upper end of said chute is disposed at an elevation below said discharge point and in a vertical plane extending longitudinally of the platform adjacent said discharge point.